United States Patent
Wright et al.

[11] Patent Number: 5,991,143
[45] Date of Patent: Nov. 23, 1999

[54] METHOD FOR CONTROLLING VELOCITY OF AN ARMATURE OF AN ELECTROMAGNETIC ACTUATOR

[75] Inventors: Danny Orlen Wright, Cobbs Creek; Perry Robert Czimmek, Yorktown, both of Va.

[73] Assignee: Siemens Automotive Corporation, Auburn Hills, Mich.

[21] Appl. No.: 09/122,042

[22] Filed: Jul. 24, 1998

Related U.S. Application Data

[60] Provisional application No. 60/083,329, Apr. 28, 1998, and provisional application No. 60/083,351, Apr. 28, 1998.

[51] Int. Cl.$^6$ .................................................. H01H 47/28
[52] U.S. Cl. ............................................. 361/187; 361/167
[58] Field of Search ................................... 361/160, 143, 361/187, 144, 166, 191, 167, 154; 251/129.02, 129.13, 129.12, 129.15; 123/490, 478; 335/234, 247, 253

[56] References Cited

U.S. PATENT DOCUMENTS

| | | | |
|---|---|---|---|
| 3,671,814 | 6/1972 | Dick | 317/123 |
| 4,328,526 | 5/1982 | Dilger et al. | 361/154 |
| 4,368,501 | 1/1983 | Gingrich | 361/152 |
| 4,593,658 | 6/1986 | Moloney | 123/90 |
| 4,823,825 | 4/1989 | Büchl | 137/1 |
| 4,955,334 | 9/1990 | Kawamura | 123/90 |
| 4,957,074 | 9/1990 | Weissler | 123/90 |
| 5,009,389 | 4/1991 | Kawamura | 251/129.1 |
| 5,442,515 | 8/1995 | Wallaert | 361/187 |
| 5,650,909 | 7/1997 | Remele et al. | 361/154 |
| 5,673,165 | 9/1997 | Kuhn et al. | 361/154 |
| 5,691,680 | 11/1997 | Schrey et al. | 335/256 |
| 5,701,870 | 12/1997 | Gottshall et al. | 123/490 |
| 5,708,355 | 1/1998 | Schrey | 323/282 |
| 5,711,259 | 1/1998 | Pischinger et al. | 123/90 |
| 5,742,467 | 4/1998 | Schmitz | 361/154 |
| 5,748,433 | 5/1998 | Schrey et al. | 361/210 |
| 5,775,276 | 7/1998 | Yanai et al. | 123/90.11 |

*Primary Examiner*—Albert W. Paladini
*Assistant Examiner*—Kim Huynh

[57] ABSTRACT

A method of controlling velocity of an armature of an electromagnetic actuator as the armature moves from a first position towards a second position is provided. The electromagnetic actuator includes a coil and a core at the second position. The coil generates a magnetic force to cause the armature to move towards and land at the core. Spring structure acts on the armature to bias the armature away from the second position to a resetting position. The method includes selectively energizing the coil to permit the armature to move at a certain velocity towards the core. A certain voltage corresponding to a voltage across the coil is determined when the armature is approaching the core. The certain voltage corresponds to a rate of change of magnetic flux and is used as a feedback variable to control energy to the coil so as to control a velocity of the armature as the armature moves towards the core. In one embodiment, the certain voltage is a measured terminal voltage of the coil. In another embodiment, the certain voltage is a parametrically determined voltage which mirrors the terminal voltage.

28 Claims, 6 Drawing Sheets

METHOD FOR CONTROLLING VELOCITY OF AN ARMATURE OF AN ELECTROMAGNETIC ACTUATOR

This application claims the benefit of U.S. Provisional Application Ser. No. 60/083,351, filed Apr. 28, 1998, and U.S. Provisional Application Ser. No. 60/083,329, filed Apr. 28, 1998.

BACKGROUND OF THE INVENTION

1. Field of the Invention

This invention relates to a high-speed, high-force electromagnetic actuator and more particularly, to an electromagnetic actuator for opening and closing a valve of an internal combustion engine wherein a velocity of the armature is controlled upon landing against a stator core of the actuator.

2. Description of Related Art

A conventional electromagnetic actuator for opening and closing a valve of an internal combustion engine generally includes an electromagnet which, when energized, produces an electromagnetic force on an armature. The armature is biased by a return spring and the armature is coupled with a cylinder valve of the engine. The armature is held by the electromagnet in one operating position against a stator core of the actuator and, by deenergizing the electromagnet, the armature may move towards and into another operating position by the return spring.

In an attempt to control the landing velocity of the armature, in certain electromagnetic actuator systems, power to a coil of the actuator is applied to move the armature across a gap and when the armature is approaching the stator core, a magnetic force from the coil is removed to slow down the armature and hope for a quiet or "soft" (near zero velocity) landing. Just before landing, the stator coil is reenergized to draw the armature towards and land at the stator core.

In the this type of arrangement, landing of the armature at a stator core is quite harsh and may have a velocity of approximately one meter per second. However, a required velocity value of the armature at landing calculated to provide acceptably quiet actuator operation is less than 0.04 meters per second at 600 engine rpm and less than 0.4 meters per second 6,000 engine rpm.

Accordingly, there is a need to provide control of an armature of an electromagnetic actuator to ensure that the armature completes its travel during its stroke but at the same time produces a quiet or "soft" (near zero velocity) landing of the armature against a stator core so as to prevent excessive impact wear on the armature and stator core and to reduce the amount of noise produced by such impact.

SUMMARY OF THE INVENTION

An object of the present invention is to fulfill the need referred to above. In accordance with the principles of the present invention, this objective is obtained by providing a method of controlling velocity of an armature of an electromagnetic actuator as the armature moves from a first position towards a second position. The electromagnetic actuator includes a coil and a core at the second position. The coil generates a magnetic force to cause the armature to move towards and land at the core. Spring structure acts on the armature to bias the armature away from the second position to a resetting position. The method includes selectively energizing the coil to permit the armature to move at a certain velocity towards the core. A certain voltage corresponding to a voltage across the coil is determined when the armature is approaching the core. The certain voltage is used as a feedback variable to control energy to the coil so as to control a velocity of the armature as the armature moves towards the core. In one embodiment, the certain voltage is a measured terminal voltage of the coil. In another embodiment, the certain voltage is a parametrically determined voltage which mirrors the coil terminal voltage.

In accordance with another aspect of the invention, an electromagnetic actuator is provided and includes an armature movable between first and second positions. Spring structure biases the armature towards a resetting position generally between the first and second positions. A stator is provided which has a coil and a core at the first position. The coil, when energized, applies a magnetic force to the armature to cause the armature to move towards and land at the core and to maintain the armature at the core for a predetermined period. Circuit structure provides a certain voltage which corresponds to a rate of change of magnetic flux of a magnetic circuit created by the coil and the armature. Control structure controls movement of the armature. The control structure is constructed and arranged to determine the certain voltage when the armature is approaching the core, and to use the certain voltage as a feedback variable to control the rate of change of magnetic flux and thus control a velocity of the armature as the armature moves towards the core.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
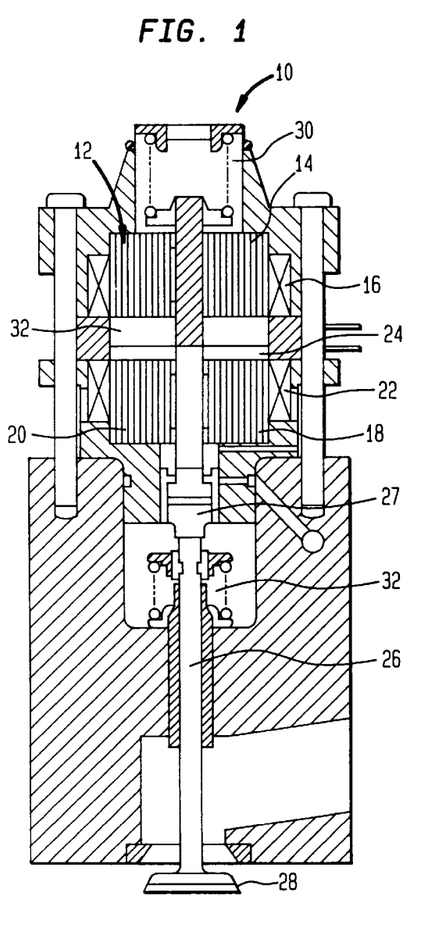
FIG. 1 is a sectional view of an electromagnetic actuator provided in accordance with the principles of the present invention, shown in a valve open position.
Figure 2:
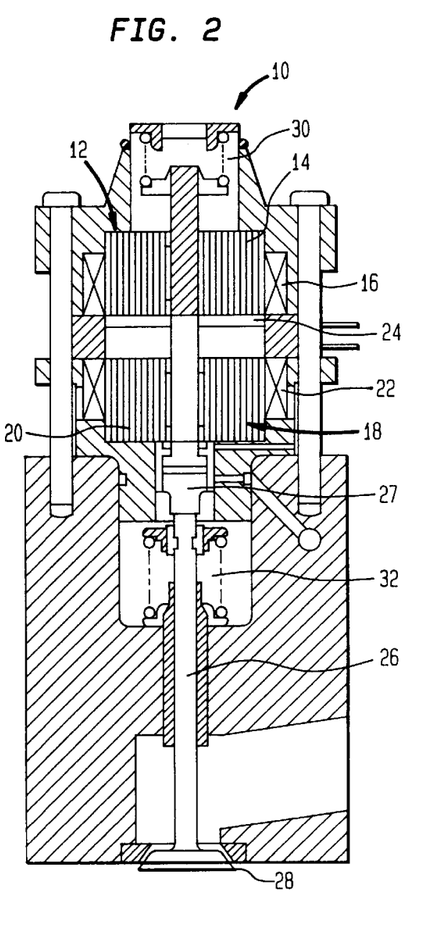
FIG. 2 is a sectional view of the electromagnetic actuator of FIG. 1, but shown in a valve closed position.

Referring to FIGS. 1 and 2, an electromagnetic actuator is shown, generally indicated 10, provided in accordance with the principles of the present invention. The electromagnetic actuator 10 includes a first electromagnet, generally indicated at 12, which includes a stator core 14 and a solenoid coil 16 associated with the stator core 14. A second electromagnet, generally indicated at 18, is disposed generally in opposing relation to the first electromagnet 12. The second electromagnet includes a stator core 20 and a solenoid coil 22 associated with the stator core 20. The electromagnetic actuator 10 includes an armature 24 which is attached to a stem 26 of a cylinder valve 28 through a hydraulic valve adjuster 27. The armature 24 is disposed generally between the electromagnets 12 and 18 so as to be acted upon by the electromagnetic force created by the electromagnets. In a deenergized state of the electromagnets 12 and 18, the armature 24 is maintained in a position of rest (a resetting position) generally between the two electromagnets 12 and 18 by opposing working return springs 30 and 32. In a valve close position (FIG. 2), the armature 24 engages the stator core 14 of the first electromagnet 12.

To initiate motion of the armature 24 and thus the valve 28 from the closed position into an open position (FIG. 1), a holding current through solenoid coil 16 of the first electromagnet 12 is discontinued. As a result, a holding force of the electromagnet 12 falls below the spring force of the return spring 30 and thus the armature 24 begins its motion accelerated by the return spring 30. To catch the armature 24 in the open position, a catch current is applied to the electromagnet 18. Once the armature has landed at the stator core 20, the catch current is changed to a hold current which is sufficient to hold the armature at the stator core 20 for a predetermined period of time.

Figure 3:
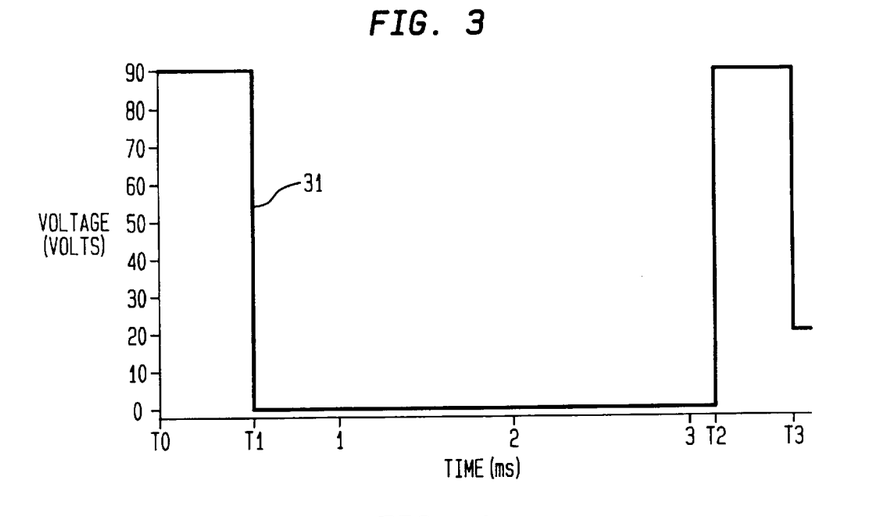
FIG. 3 is a waveform as applied to an electromagnetic actuator of the invention operating in an open loop control mode.

FIG. 3 shows a system voltage timing waveform 31 of coil 16 of the electromagnetic actuator 10 in an open loop mode of operation. To initiate movement of the armature and thus move the valve 28 from a valve open position shown in FIG. 1 to a valve closed position as shown a FIG. 2, full voltage is applied to the first solenoid coil 16 at the beginning of armature stroke at time T0. Simultaneously, power is removed from the second solenoid coil 22 to release the armature 24 from the second stator core 20. Once the armature 24 is moving, voltage at the solenoid coil 16 is removed at the time T1 to permit the armature 24 to travel as a spring mass system under simple harmonic motion until it is near closing. At time T2, full coil voltage is applied to the coil 16 to initiate a catch current phase. Finally, at a time T3, the coil voltage on the receiving coil 16 is reduced to a value sufficient to hold the armature 24 to the stator core 14 against the bias of return spring 30.

Figure 4:
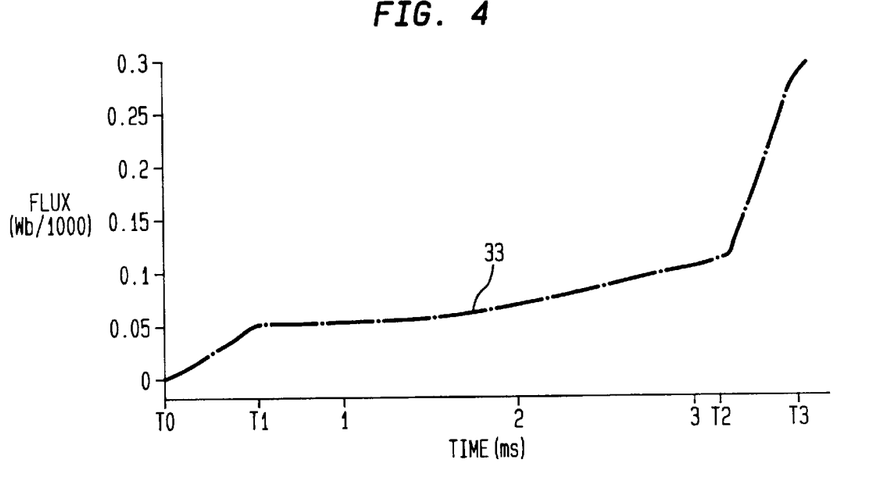
FIG. 4 is a waveform of flux generation of an electromagnetic actuator of the invention in an open loop mode of operation.

FIG. 4 is a simplified flux waveform 33 of the electromagnetic actuator 10 in an open loop mode of operation as obtained by a Hall sensor. When an initial voltage pulse is applied to a solenoid coil, e.g., coil 16, flux begins to build up until T1. At time T1, the voltage is removed and as the armature 24 is moving across the gap 32, there is only a slight amount flux increase. At time T2, the voltage is re-applied to the coil 16, the flux increases rapidly and at time T3 the voltage is reduced to provide a holding current. In theory, values can be calculated for time T1, T2 and T3 to achieve a desirable soft landing of the armature 24 against a stator core. In practice, however, this is almost never achievable because the system is constantly being perturbed by real world variation parameters such as damping, temperature, deflections, tolerance stack up, vibration, engine gas loads, etc.

From the above discussion, is clear that some form of feedback algorithm is required to increase the robustness of the armature control to ensure a soft landing thereof.

U.S. patent application Ser. No. 09/025,986, entitled "Electronically Controlling the Landing of an Armature in an Electromagnetic Actuator", the contents of which is hereby incorporated into the present specification by reference, discloses using a flux sensor to sense a rate of change of magnetic flux in an electromagnetic actuator. The rate of change of flux sensed is used as a feedback variable to control a landing velocity of an armature of the actuator by controlling the catch current. Sensing flux for feedback control of an electromagnetic actuator has two distinct advantages over other available parameters: (1) it is extremely sensitive in response (inverse square law) to armature motion in a region near landing of the armature, and (2) its signal voltage is monotonically increasing with increasing displacement of the armature. These features do not apply to parameters such as position, velocity, or electrical current. The use of a flux sensor in an electromagnetic actuator is effective in operation, however, the cost of the actuator is increased due to the need for one or more flux sensors.

Figure 5:
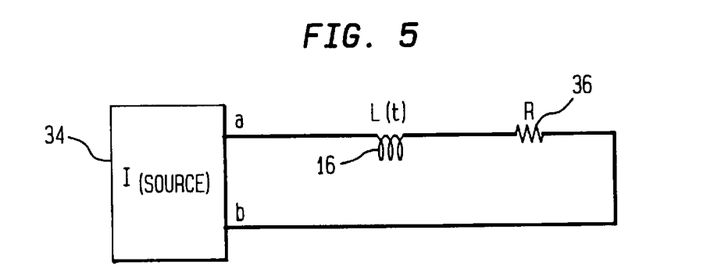
FIG. 5 is a schematic representation of a solenoid coil of the electromagnetic actuator of FIG. 1, shown connected electrically to a programable current regulator.

The invention provides feedback control based on a rate of change of flux without the need for a flux sensor. Thus, in accordance with one aspect of the invention, coil 16 (FIG. 5) is connected electrically to a programable current regulator 34. Description of operation is made with regard to coil 16 and core 14 of the first electromagnet. It can be appreciated that this description applies to the operation of the second electromagnet as well. As is commonly employed, a current level of a sufficiently large value is initially commanded in the solenoid coil 16 to achieve rapid movement of the armature 24 through its stroke. The current level is then reduced to a value just enough to hold the armature 24 in contact with the associated stator core 14 until the end of a desired cycle for the actuator 10 at which time current is reduced zero. As shown in FIG. 5, the solenoid coil 16 has been represented as a pure inductance in series with its internal resistance 36 and the current regulator 34 is a "black box equivalent". The resistance R is essentially constant during this analysis but the inductance L(t) is seen to be time varying as a function of (primarily) the position of the armature and (secondarily) the magnetic hysteresis properties with respect to magnetomotive force induced in the ferrous material of the armature 24 and associated stator core 14.

Applying Kirchoff's Voltage Law around this simple series circuit shows that the terminal voltage from (a) to (b) of the current regulator must at all times equal the sum of the IR drop on the internal resistance R and the counter electromotive force (EMF) of the coil. This is expressed mathematically in the following equation:

$$V(t)_{a-b} = N \frac{d(phi)}{dt} + I(t)R \qquad \text{(Equation 1)}$$

Furthermore, by Faraday's Law, the EMF of a coil having N number of turns equals the product of the number of turns times the rate of change of flux in the coil 16. In applications such as a solenoid coil for an electromagnetic actuator for a valve of an internal combustion engine, the coil EMF is quite large during activation of the armature (100 volts typical) while the IR drop term in Equation 1 is small enough to be negligible for the purpose of sensing the rate of change of flux (6 to 8 volts typical). Therefore, the terminal voltage on the coil 16 is nearly in exact proportion to the time rate of change of the flux in the actuator 10 during operation. Thus, this terminal voltage can be utilized as a feedback variable to control soft landing of the armature 24 of the electromagnetic actuator 10, without the need for any external flux sensor.

Figure 6:
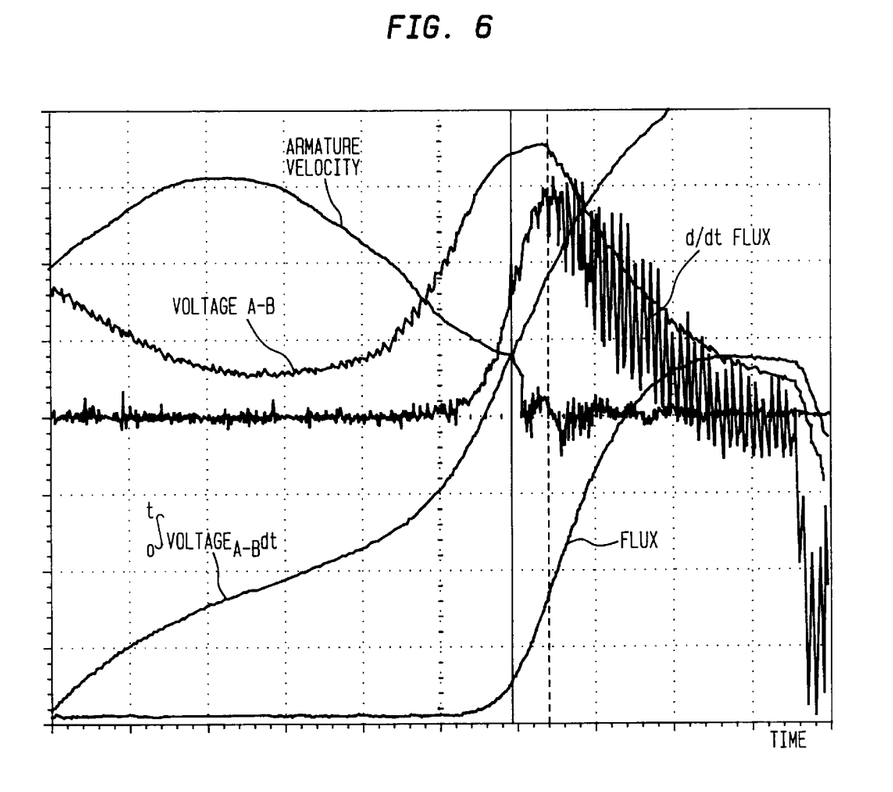
FIG. 6 are waveforms of an actuator of the invention showing coil terminal voltage, an integral of the terminal voltage, measured magnetic flux and the derivative of the measured magnetic flux, to illustrate the relationships between terminal voltage and magnetic flux.

FIG. 6 shows waveforms of an actuator of the invention including a terminal voltage of a coil of the actuator, an integral of the terminal voltage, magnetic flux as obtained by a flux sensor for comparative purposes, and the derivative of the magnetic flux. The applicants have determined a relationship exists between the terminal voltage and the derivative of magnetic flux. This relationship is clearly shown in FIG. 6. In addition, the integral of the terminal voltage is seen to be proportional to the level of magnetic flux in the armature-stator magnetic circuit.

Figure 7:
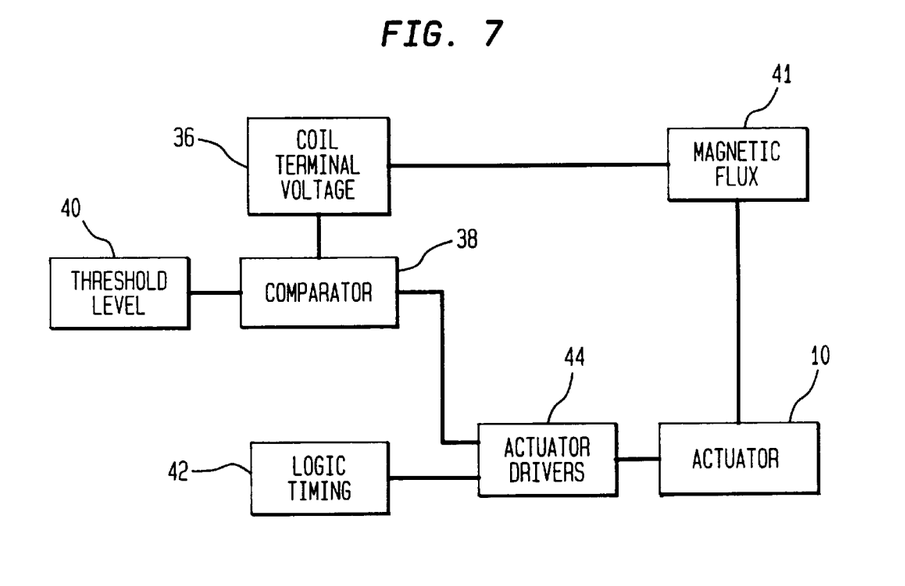
FIG. 7 is a block diagram of a control circuit for the electromagnetic actuator in accordance with a first embodiment of the present invention.

With reference to FIG. 7, a block diagram of an operating circuit according to one embodiment of the present invention is shown. The circuit is based on controlling the armature velocity near landing by regulating a rate of change of magnetic flux in the armature/stator magnetic circuit by measuring the terminal voltage of the coil. In the circuit of the FIG. 7, a terminal voltage 36 of a coil 16 is applied to a comparator 38. A threshold level 40 is also applied to the comparator 38. The output of the comparator 38 is "logically added" with a logic timing component 42 and is supplied to a drive circuit 44 to drive an actuator 10. Once the actuator driver is energized, the solenoid coil 16 is energized.

Figure 8:
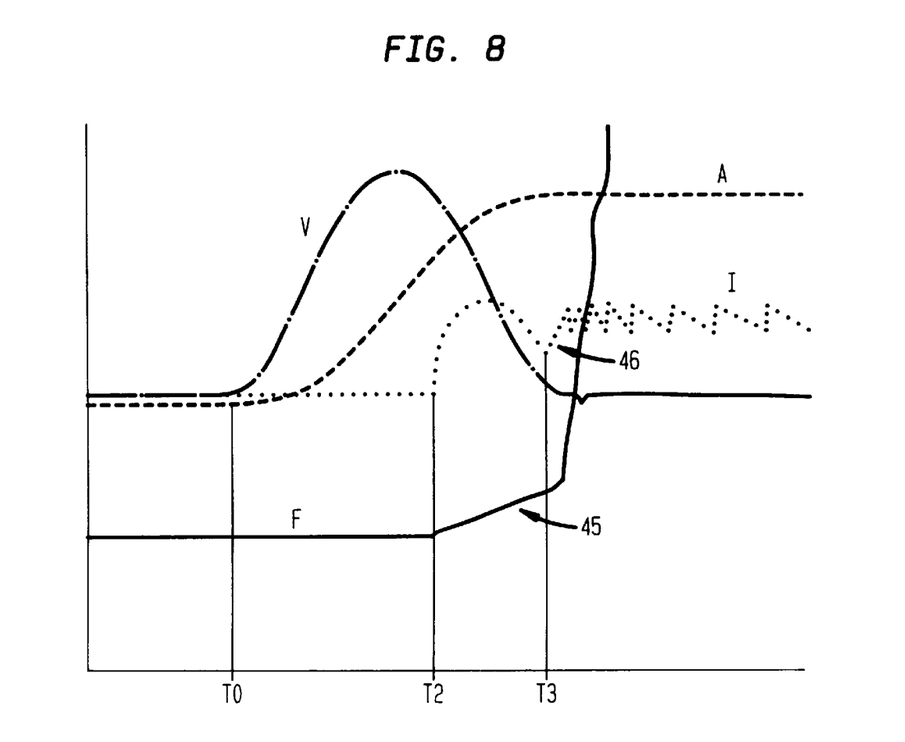
FIG. 8 is a graphical representation of an actuator of the invention operating in a closed loop mode and when approaching a landing position, showing a current waveform, a voltage waveform, a position waveform and a flux waveform.

The measured coil terminal voltage 36, corresponding to the rate of change of magnetic flux, is compared to the threshold level 40. The threshold level 40 is set at a desired rate of change of magnetic flux at certain operating conditions of the actuator to produce a soft landing of the armature. If the terminal voltage 36 is above the threshold level 40, the catch current supplied to the solenoid coil 16 is decreased, and if the terminal voltage 36 is below the threshold level 40, the catch current supplied to the solenoid coil 16 is increased, thus controlling the magnetic flux 41 between T2 and T3 as indicated in FIG. 8. This is a closed loop control and the velocity waveform labeled "V" in FIG. 8 illustrates the landing velocity near zero at or near T3. The magnetic flux waveform obtained from a flux sensor is indicated at "F" in FIG. 8 for comparative purposes. The current waveform of a coil is indicated at "I" in FIG. 8. The dip 46 in the current when the armature 24 seats at a stator core is illustrated. Finally, the wave shape labeled "A" in FIG. 8 indicates the movement of the armature 24 from an initial position to a landing position at a stator core.

It is noted that the flux buildup is generally linear near impact of the armature 24 with a stator core, e.g., core 14. The buildup of the flux in this region 45 between T2 and T3 is controlled by controlling the catch current and defines an inclined line. Thus, as the armature 24 is approaching landing, the flux is inhibited, modulating the magnetic force from the receiving stator core 14 and coil 16 and causing the velocity of the armature 24 to approach zero. At T3, the flux is no longer inhibited and the armature 24 is held against the stator core 14.

The final value of flux, which is the force on the armature, is set at T3 to the hold current so as to just exceed the opposing spring force created by spring 30. This permits rapid release of the armature 24 at the beginning of the next stroke of the valve 28. In addition, the hold current minimizes the power required to control the actuator 10.

Although measuring the coil terminal voltage directly is effective for controlling soft landing of the armature 24 of an actuator 10, it is preferable to not physically measure the high common mode voltage typically present at each terminal of the coil. In an electromagnetic actuator 10 of the type used to control valves of an internal combustion engine, the required common mode rejection ratio (CMRR) for the sensing amplifier is on the order of 60 db. While this CMRR is within the state-of-the-art for integrated circuit amplifiers, the real world applications of such measurement suffer from offset drift and electrical interference due to extremely high dV/dt at the voltage being measured.

Thus, in accordance with the principles of the present invention, a mirror image of the coil terminal voltage and hence a mirror image of the rate of change of flux in the actuator's magnetic circuit is provided by the circuit of the actuator 10 such that there is no need to physically monitor the coil terminals to measure the coil terminal voltage.

Figure 9:
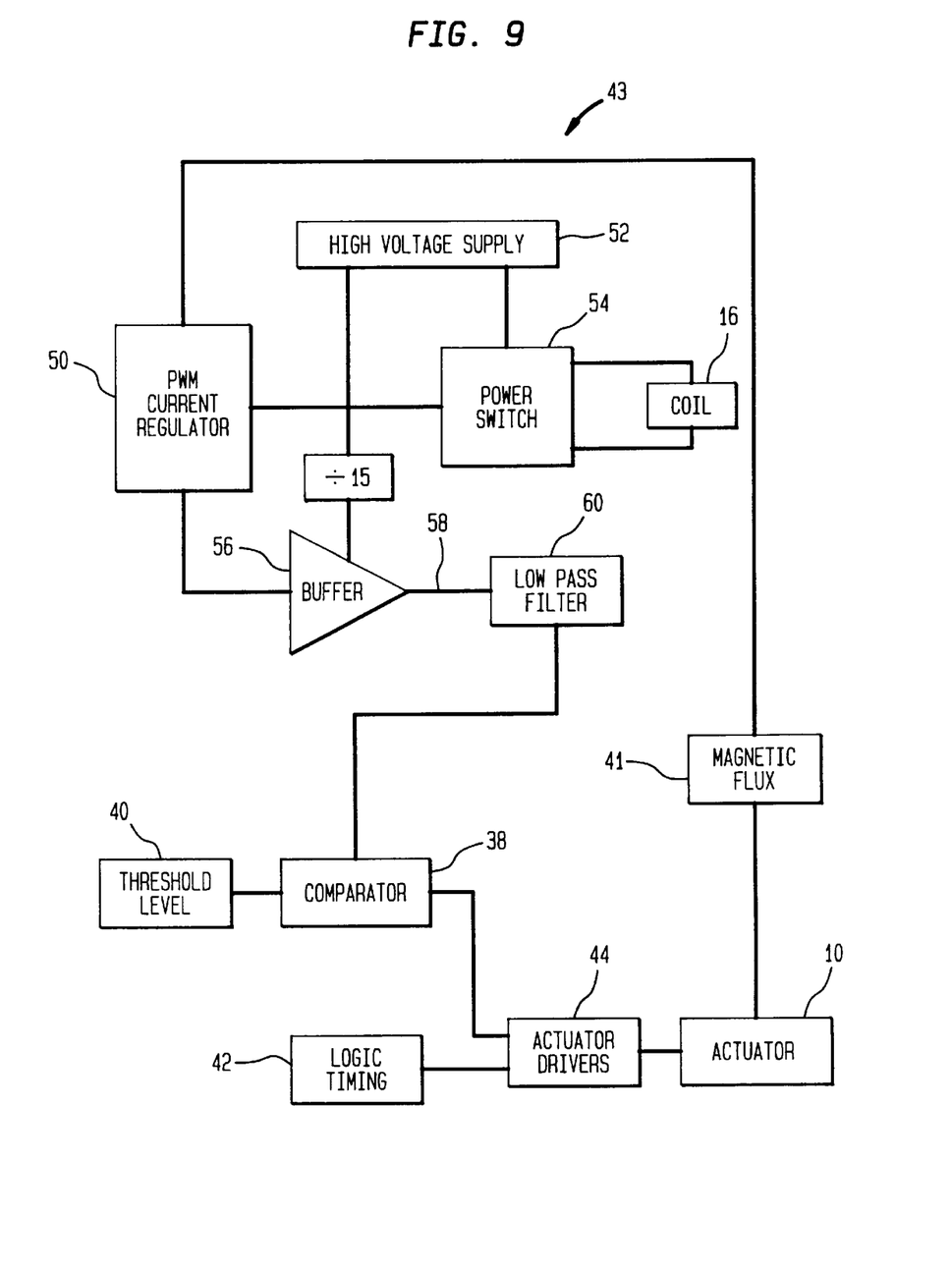
FIG. 9 is a block diagram of a mirror circuit for an electromagnetic actuator provided in accordance with a second embodiment of the invention.

FIG. 9 shows a block diagram of a mirror circuit 43 the actuator 10 provided in accordance with the principles of the present invention. The solenoid coil 16 of the actuator 10 is driven preferably by a pulse width modulation (PWM) (switchmode) current regulator 50 which provides a pulse train to a high voltage power transistor stage (including a high operating voltage supply 52 and a power switch 54) which subsequently switches voltage pulses across the load of the coil 16. It can be appreciated that power can be regulated by other means, such as, for example, a voltage regulator or amplifier. The flux mirror addition to this conventional approach consists of routing the logic level PWM signal from the current regulator 50 through a buffer 56. The rail voltage of the buffer 56 is derived from a scaled-down replica of the system high voltage supply 52. Finally, the scaled and buffered pulse train 58 is smoothed by a low pass filter 60.

The time constant of the low pass filter 60 is selected to match the rate of armature motion in the actuator 10. The output from the low pass filter 60 is scaled-down from and mirroring the high operating voltage of the coil and corresponds to the desired time rate of change of magnetic flux d(phi)/dt which is used as a feedback variable to control the landing velocity of the armature 24 in the manner discussed above.

The mirror circuit of the invention is much less troublesome to implement in real world applications due to the reduction or elimination of problems caused by both CMRR requirements and interference from high dV/dt.

Figure 10:
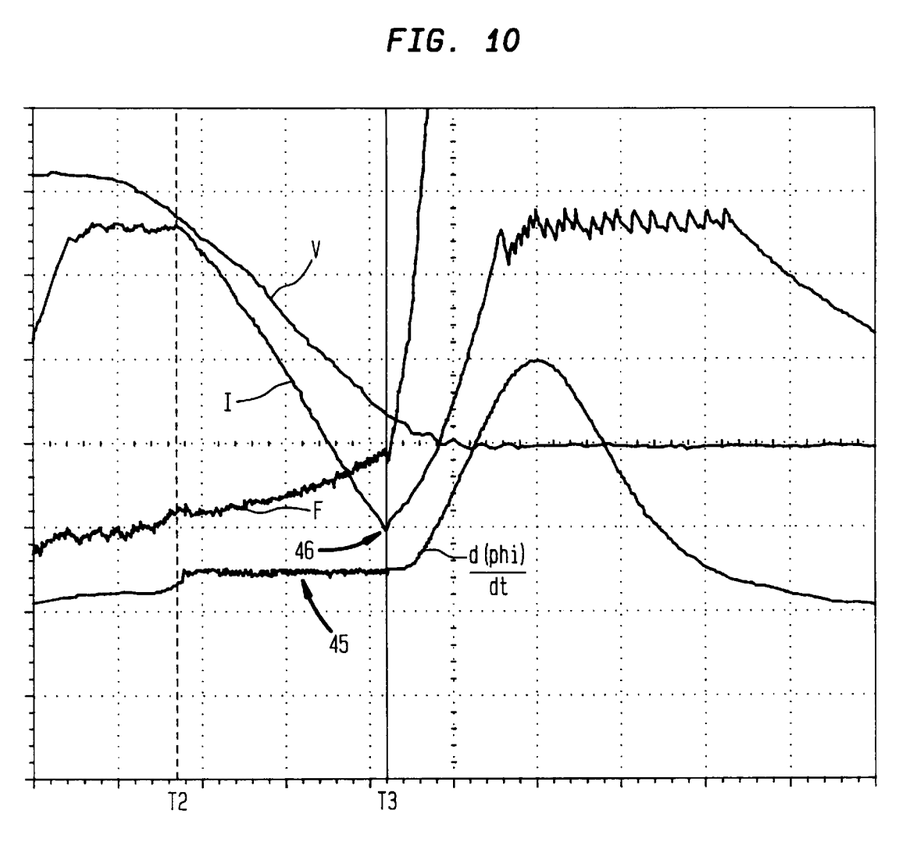
FIG. 10 are waveforms of an electromagnetic actuator of the invention operating in a closed loop mode, utilizing the circuit of FIG. 9, to provide a soft landing of the armature of the actuator.

FIG. 10 shows waveforms of an electromagnetic actuator 10 being controlled by the mirror circuit of FIG. 8. "V" is the armature velocity which, as shown, decreases to zero near T3. The coil current is indicated at "I" and the dip 46 in the current occurs at T3. The actual magnetic flux is indicated at "F" which was obtained by a flux sensor and is illustrated for comparative purposes. The rate of change of magnetic flux d(phi)/dt is shown which corresponds to a parametrically determined voltage obtained from the mirror circuit of FIG. 9. The applicants have found that the rate of change of magnetic flux d(phi)/dt is controlled to be generally constant between T2 and T3 which is found to be optimal for providing the desired soft landing of the armature 24 at a stator core. By controlling the rate of change of magnetic flux between T2 and T3 in this manner, the highly non-linear characteristic of the flux buildup (and hence the force on the armature) is eliminated to provide the desired soft landing of the armature.

It has thus been seen that the objects of this invention have been fully and effectively accomplished. It will be realized, however, that the foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of controlling velocity of an armature of an electromagnetic actuator as the armature moves from a first position towards a second position defining a cycle, the electromagnetic actuator including a coil and a core at said second position, said coil generating a magnetic force to cause the armature to move towards and land at said core, and spring structure acting on the armature to bias the armature away from said second position to a resetting position, the method including:
   selectively energizing said coil when said armature is moving at a certain velocity towards said core;
   determining a certain voltage corresponding to a voltage across said coil when said armature is moving toward said core; and
   during said cycle, using said certain voltage as a feedback variable to control energy to said coil to thereby control said velocity of said armature as said armature continues to move towards said core.

2. The method according to claim 1, wherein selectively energizing said coil includes applying a catch current to said coil when said armature is approaching said core, said catch current being controlled based on a value of said certain voltage.

3. The method according to claim 2, wherein once said armature lands at said core, said catch current is changed to a current sufficient to hold said armature at said core.

4. The method according to claim 1, wherein determining said certain voltage includes providing a parametrically determined voltage which mirrors a terminal voltage of said coil, said parametrically determined voltage defining said certain voltage.

5. The method according to claim 4, wherein said parametrically determined voltage is less than said terminal voltage.

6. The method according to claim 4, wherein said coil is driven by a current regulator, and wherein a circuit of said electromagnetic actuator includes a buffer and a low pass filter, the method including:
   routing a logic level signal from the current regulator through said buffer, rail voltage at said buffer being derived from a scaled-down replica of a high voltage supply of said actuator, and
   smoothing a scaled and buffered pulse train from said buffer with said low pass filter, an output of said low pass filter defining said parametrically determined voltage.

7. The method according to claim 1, wherein the velocity of said armature is controlled so as to be substantially zero as said armature lands at said core.

8. The method according to claim 1, wherein determining said certain voltage includes measuring a terminal voltage of said coil, said terminal voltage defining said certain voltage.

9. The method according to claim 1, wherein said certain voltage is proportional to a rate of change of magnetic flux of a magnetic circuit created by said coil, core and said armature, and said velocity of said armature being controlled by controlling current to said coil and thus controlling said rate of change of magnetic flux.

10. The method according to claim 9, wherein said rate of change of magnetic flux is controlled to be generally constant.

11. A method of controlling velocity of an armature of an electromagnetic actuator at two end positions of travel of the armature, the electromagnetic actuator having first and second stators each having a coil and an associated core at respective said end positions for applying magnetic forces to the armature to cause the armature to be held at one end position for a predetermined period and to move towards and land at the other end position and be held at the other end position for a predetermined period, and spring structure associated with the armature to apply a resetting force to the armature to move the armature away from each end position, the method including:
   selectively energizing one of said coils when said armature is moving at a certain velocity towards the core associated with said one coil;
   determining a certain voltage corresponding to a voltage across said one coil when said armature is approaching said core associated with said one coil; and
   before said armature reaches said core associated with said one coil, using said certain voltage as a feedback variable to control energy to said one coil to thereby control a velocity of said armature as said armature continues to move towards said core associated with said one coil;
   selectively energizing the other of said coils when said armature is moving at a certain velocity towards the core associated with said other coil;
   determining a certain voltage corresponding to a voltage across said other coil when said armature is approaching said core associated with said other coil; and
   before said armature reaches said core associated with said other coil, using said certain voltage as a feedback variable to control energy to said other coil to thereby control a velocity of said armature as said armature continues to move towards said core associated with said other coil.

12. The method according to claim 11, wherein selectively energizing one of said coils includes applying a catch current to said one of said coils when said armature is approaching said core associated with said one of said coils, said catch current being controlled based on a value of said certain voltage.

13. The method according to claim 12, wherein once said armature lands at a selective one of said cores, said catch current is changed to a current sufficient to hold said armature at said selective one of said cores associated with one of said coils.

14. The method according to claim 11, wherein determining said certain voltage includes providing a parametrically determined voltage which mirrors said terminal voltage of one of said coils, said parametrically determined voltage defining said certain voltage.

15. The method according to claim 14, wherein each of said coils is driven by a current regulator, and further providing a buffer and a lowpass filter, the method including:

routing a logic level signal from the current regulator through said buffer, rail voltage at said buffer being derived from a scaled-down replica of a high voltage supply of said actuator, and smoothing a scaled and buffered pulse train from said buffer with said low pass filter, an output of said low pass filter defining said parametrically determined voltage.

16. The method according to claim 11, wherein the velocity of said armature is controlled so as to be substantially zero as said armature lands at a selective one of said cores associated with one of said coils.

17. The method according to claim 11, wherein determining said certain voltage includes measuring a terminal voltage of one of said coils, said terminal voltage defining said certain voltage.

18. The method according to claim 11, wherein said certain voltage is proportional to rate of change of magnetic flux of a magnetic circuit created by one of said coils and said armature, and said velocity of said armature being controlled by controlling current to said one of said coils and thus controlling said rate of change of magnetic flux.

19. An electromagnetic actuator comprising:

an armature movable between first and second positions defining a cycle;

spring structure biasing said armature towards a resetting position generally between said first and second positions;

a stator having a coil and a core at said first position, said coil being constructed and arranged to apply a magnetic force, when energized, to the armature to cause the armature to move towards and land at said core and to maintain said armature at said core for a predetermined period;

circuit structure providing a certain voltage which corresponds to magnetic flux of a magnetic circuit created by said coil, core and said armature; and control structure to control movement of said armature, said control structure being constructed and arranged to determine said certain voltage when said armature is approaching said core, and during said cycle, to use said certain voltage as a feedback variable to control energy to said coil thereby controlling a velocity of said armature as said armature continues to move towards said core.

20. The electromagnetic actuator according to claim 19, wherein said certain voltage corresponds to a rate of change of said magnetic flux.

21. The electromagnetic actuator according to claim 19, wherein said control structure is constructed and arranged to use a terminal voltage of said coil as said feedback variable, said terminal voltage defining said certain voltage.

22. The electromagnetic actuator according to claim 19, wherein said circuit structure is constructed and arranged to provide a parametrically determined voltage which mirrors a terminal voltage of said coil, said control structure using said parametrically determined voltage as said feedback variable, said parametrically determined voltage defining said certain voltage.

23. The electromagnetic actuator according to claim 22, wherein said circuit structure includes a buffer and a low pass filter, said buffer receiving a logic level signal from a current regulator, rail voltage at said buffer being derived from a scaled-down replica of a high voltage supply of said actuator, a scaled and buffered pulse train from said buffer being smoothed with said low pass filter, an output of said low pass filter defining said parametrically determined voltage.

24. The electromagnetic actuator according to claim 19, wherein said control structure is constructed and arranged to control said velocity of said armature to be substantially zero upon landing of said armature at said core.

25. The electromagnetic actuator according to claim 19, further comprising a second stator having a coil and an associated core at said second position, said control structure being constructed and arranged to determine a certain voltage relating to said coil of said second stator when said armature is near said core of said second stator, and to use said certain voltage with respect to said second stator as a feedback variable to control velocity of said armature as said armature approaches said core of said second stator.

26. The electromagnetic actuator according to claim 25, wherein said armature has opposing surfaces, said spring structure comprising a pair of springs, each spring of said pair being operatively associated with a respective one of said opposing surfaces of said armature and with the respective first and second stator, said springs having generally equal spring constants so that in said resetting position, said springs apply generally equal and opposite forces to said armature so that said armature is disposed generally between said first and second stators.

27. The electromagnetic actuator according to claim 19, further comprising a valve member connected to said armature.

28. A method of controlling velocity of an armature of an electromagnetic actuator as the armature moves from a first position towards a second position, the electromagnetic actuator including a coil and a core at said second position, said coil generating a magnetic force to cause the armature to move towards and land at said core, and spring structure acting on the armature to bias the armature away from said second position to a resetting position, the method including:

selectively energizing said coil when said armature is moving at a certain velocity towards said core;

determining a certain voltage corresponding to a voltage across said coil when said armature is moving toward said core; and comparing said certain voltage to a threshold level and based on the comparison, controlling energy to said coil to thereby control said velocity of said armature as said armature continues to move towards said core.

* * * * *